Dec. 20, 1966 — R. H. WILLIAMS — 3,292,589
HUMMING BIRD FEEDER
Filed June 17, 1965 — 2 Sheets-Sheet 1
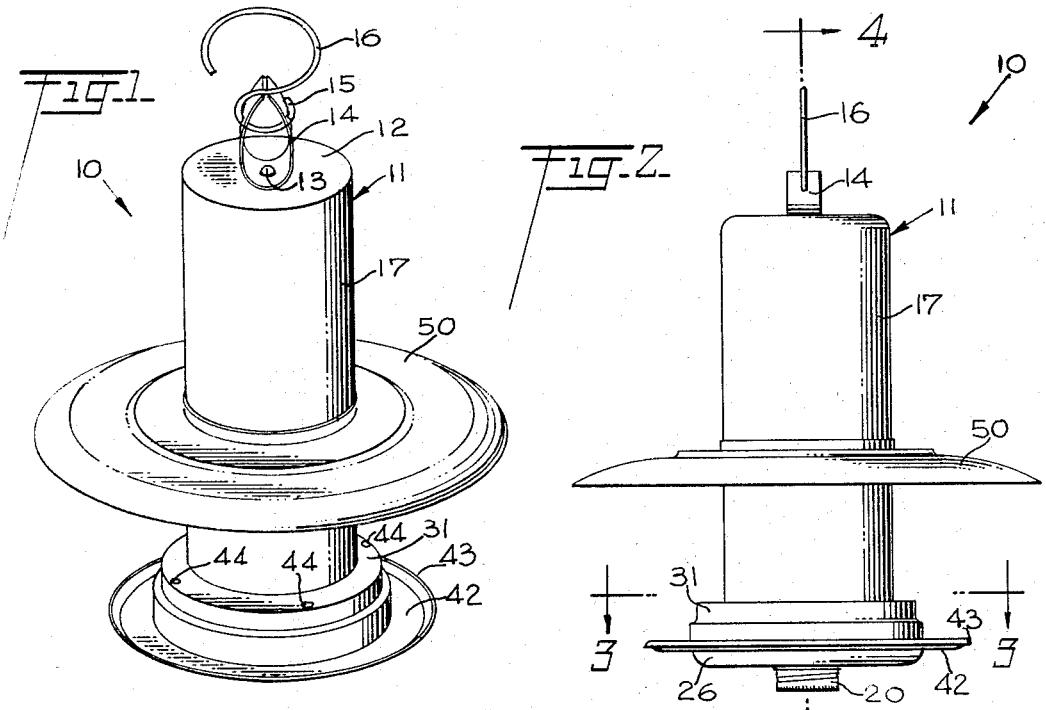
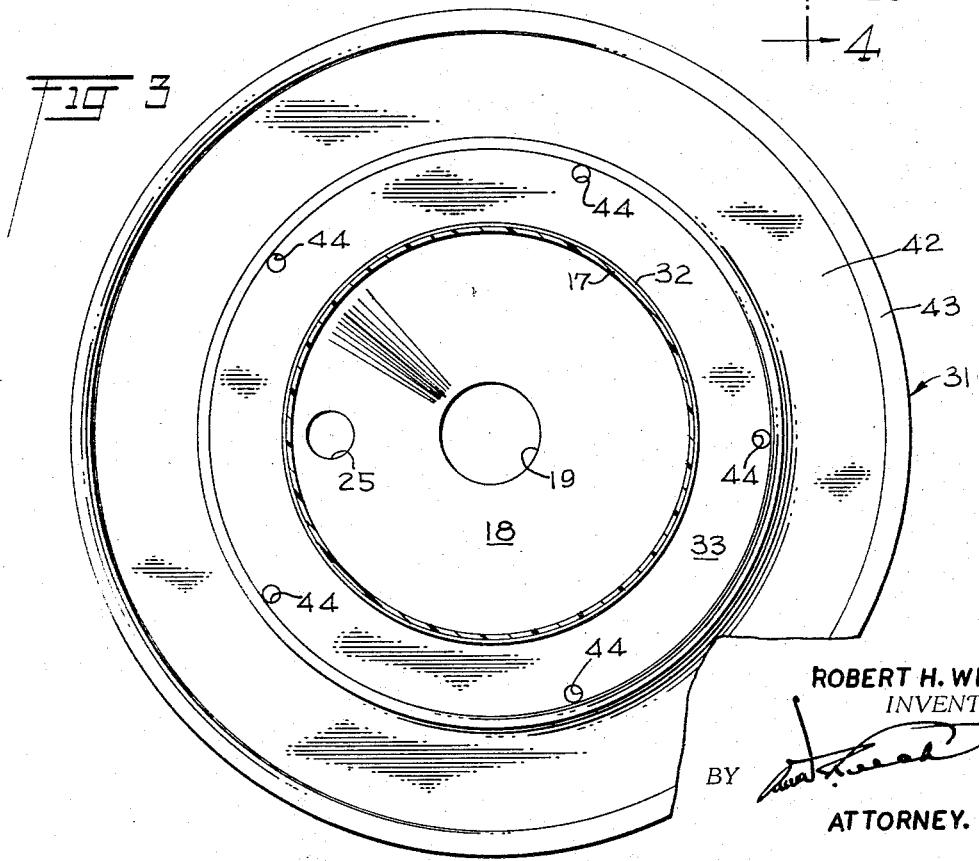
ROBERT H. WILLIAMS
INVENTOR.
BY
ATTORNEY.

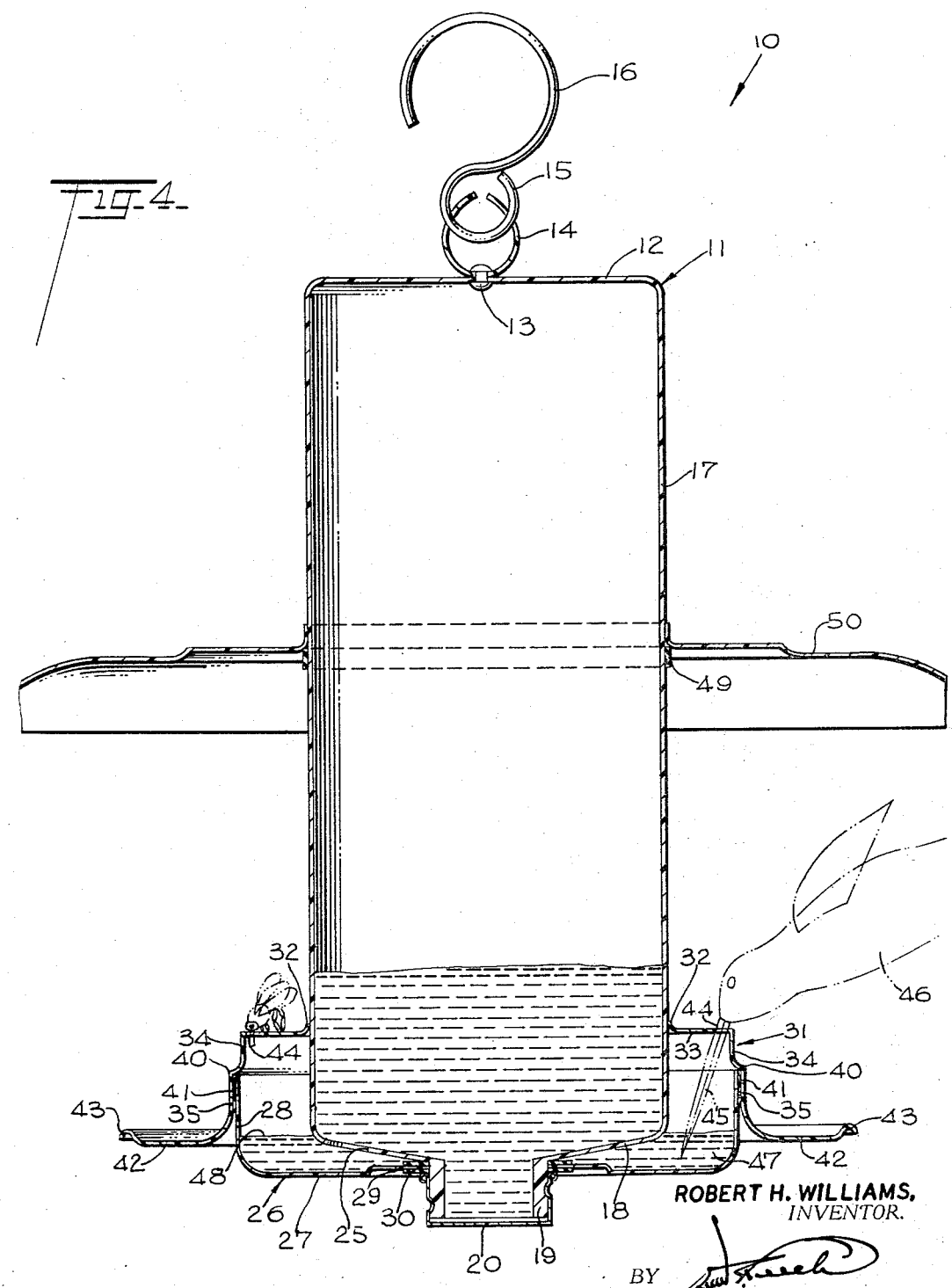

United States Patent Office 3,292,589
Patented Dec. 20, 1966

3,292,589
HUMMING BIRD FEEDER
Robert H. Williams, Rte. 2, Bandera, Tex. 78003
Filed June 17, 1965, Ser. No. 464,617
4 Claims. (Cl. 119—77)

This invention relates to bird feeders and particularly to a feeder for humming birds.

One of the defects of devices heretofore provided for feeding humming birds is that the sugar solution made available to the humming birds was equally available to wasps, bees and other flying insects to whom said solution is attractive. The purpose of the device was thus defeated by the preponderant attention paid thereto by flying insects some of whom are inclined to fight off the birds so as to keep them from feeding.

It is an object of the present invention to provide a humming bird feeder wherein a sugar solution will be freely available to humming birds but which will deny access to said solution by flying insects.

Another object is to provide such a feeder which is constructed almost entirely of thin sheet plastic and is thus light in weight, immune to corrosion and inexpensive to manufacture.

The manner of accomplishing the foregoing objects as well as further objects and advantages will be made manifest in the following description taken in connection with the accompanying drawings, in which:

FIG. 1 is a perspective view of a preferred embodiment of the invention.

FIG. 2 is a side elevational view of the invention.

FIG. 3 is an enlarged horizontal sectional view taken on the line 3—3 of FIG. 2.

FIG. 4 is an enlarged vertical sectional view taken on the line 4—4 of FIG. 2.

Referring specifically to the drawings the invention is there shown as embodied in a humming bird feeder 10 which includes, as the main element of the structure thereof, a vertically disposed, inverted cyclindrical, thin walled plastic bottle 11 the upper wall 12 of which is perforated centrally to receive a rivet 13 which tightly closes the hole for receiving the same and secures to said wall a hook mount 14 made of a bent U-shaped piece of sheet plastic which is perforated to receive the eye 15 of a brass wire hook 16 which is provided for supporting the feeder 10.

The wall 12 is integrally united with the outer cyclindrical shell 17 of bottle 11, the lower end of said shell being closed by a shallow conoidal wall 18 having an externally threaded bottle neck 19 integrally formed therewith and extending downwardly therefrom. A plastic or lacquered metal cap 20 is screwed upwardly onto the neck 19. The bottle bottom wall 18 is provided with a solution escape hole 25 (see FIGS. 3 and 4).

Mounted on the lower end of the bottle 11 is a feeding bowl 26 which includes a centrally apertured approximately flat bottom wall 27 and a peripheral circular vertical wall 28 which extends upwardly a substantial distance above the level at which escape hole 25 is provided in bottle 11. The central aperture of bottom wall 27 slidably receives the bottle neck 19 and is trapped, together with gasket rings 29 and 30, between the bottle cap 20 and the bottom wall 18 of the bottle 11, with enough pressure to make sealing connections between the bottle 11, the gasket 29, the bottom bowl wall 27, the gasket 30, and the upper annular edge of the bottle cap 20 so as to form a seal between said bottle cap and said bottom bowl wall 27, and between the latter and said bottle bottom wall 18.

Fitting snugly downwardly over the peripheral wall 28 of feeding bowl 26 is an annular bowl cover 31 having an upwardly turned internal lip 32 which snugly engages the cylindrical shell 17 of bottle 11 when said bowl cover is pressed downwardly over said bottle. This lip is formed on a flat annular deck 33 of said cover from the outer edge of which a short cylindrical wall 34 is formed downwardly this wall flaring out wardly at its lower edge to unite with a second short cyclindrical wall 35 to provide a shoulder 40 which fits against the upper edge of peripheral wall 28 of the feeding bowl 26 while the short cyclindrical wall 35 is spaced from the peripheral wall 28 of the feeding bowl 26 by a thin layer of sealing adhesive 41 which unites the cover 31 with the bowl 26 and makes a fluid tight seal therebetween.

The lower portion of the short cyclindrical wall 35 of the bowl cover 31 flares outwardly to form a lower annular horizontal deck 42 having a raised annular peripheral rim 43 which is provided to serve as a perch for birds inclined to alight on said deck. The upper annular deck 33 of the bowl cover 31 is provided with a plurality of feeding holes 44 which are uniformly of a diameter which will readily admit the bill 45 of a humming bird 46 (see FIG. 4) but which is too small for any of the sugar feeding flying insects such as bees, wasps and the like to secure admission therethrough to the feeding bowl 26.

The bottle 11 is adapted to contain a body of sugar solution 47 which is replenished by inverting the feeder 10 and removing the cap 20 after which a quantity of the solution is poured into the bottle through the bottle neck 19. After this is done the cap 20 is tightly replaced and the feeder 10 is returned to its normal upright position suspended on the hook 16 as shown in FIG. 4. This causes a certain quantity of the sugar solution to flow outwardly through the escape hole 25 and fill the lower portion of the feeding bowl 26 with solution up to a normal feeding level 48 which is a slight distance above the escape hole 25. As shown in FIG. 4 the distance vertically between the upper deck 33 and the normal feeding level 48 is such that a bee, wasp or other sugar feeding flying insect is completely unable to reach level 48 with his proboscis, and as the holes 44 are too small for the insect to get his body through one of these, this class of insects are effectively excluded from gaining access to the sugar solution 47.

The vertical distance between the deck 33 and the normal feeding level 48 however is carefully limited to assure that a humming bird 46 may readily reach the sugar solution in the bowl 26 by extending his bill downwardly through one of the holes 44. Thus the humming birds have access to the sugar solution provided by the bird feeder 10 and the sugar feeding flying insects are excluded from such access.

Snugly fitting the bottle 11 and supported on the latter by a rubber band 49 stretched about the bottle is an annular rain shield 50 which is downwardly dished so as to shed rain and thus give shelter to birds feeding from the feeder 10 while preventing access thereto through the holes 44.

While only a single embodiment of the invention is disclosed herein, it is to be understood that this is for illustrative purposes, and various modifications and changes may be in said embodiment without departing from the spirit of the invention or the scope of the appended claims.

The claims are:

1. In a humming bird feeder, the combination of: vacuum trapped sugar solution reservoir means having an escape passage near the lower end thereof; a feed bowl disposed to receive solution discharged outwardly from said reservoir means through said escape passage, said feed bowl extending above the level of said passage so as to exclude air from access to the latter except when solution is removed from said bowl, as by feeding therefrom; a cover for said bowl having at least one hole which is large enough to receive the bill of a humming bird but too small to admit the body of a sugar feeding flying insect, said cover being spaced above the normal lever of solution maintained in said bowl by the vacuum action of said reservoir means, a sufficient distance to prevent said flying insects reaching said solution through said hole, said distance being short enough however to permit a humming bird to readily feed from said solution, by extending his bill through said hole, said bowl having a bowl bottom which underlies said reservoir means and has a hole underlying said reservoir means; a threaded neck which is smaller in diameter than said reservoir means and is integrally formed thereon to extend downwardly therefrom, said neck neatly fitting and extending through said hole; screw cap means adapted to be screwed onto said neck to unite said bowl with said reservoir means; and seal means, effective when said cap means is tightened on said neck, to produce a liquid-tight seal between said cap means and said bowl, said cap means when loosened, with said feeder inverted, affording a means for introducing a supply of liquid bird feeding material into said reservoir means.

2. A humming bird feeder which comprises an inverted thin-walled bottle having a threaded neck extending downwardly axially from the lower end of the bottle and a cap screwed onto said neck, said bottle being a reservoir for sugar solution and having an eccentric escape passage for said solution near its lower end, a feed bowl disposed to receive solution discharged from said passage, said bowl being circular with a centrally apertured bottom which fits around and makes a sealed connection with said neck between said cap and the lower end of said bottle, said bowl having a peripheral wall which extends upwardly a substantial distance above the normal solution level in said bowl, and a cover which comprises an annulus which snugly fits said bottle above said bowl and has a peripheral wall which extends downwardly into sealing relation with the peripheral wall of said bowl, said cover having at least one hole which is large enough to receive the bill of a humming bird but too small to admit the body of a sugar-feeding flying insect, said cover being spaced above the normal level of solution in said bowl a sufficient distance to prevent said flying insects reaching said solution through said hole while permitting said solution to be reached through said hole by a humming bird.

3. A humming bird feeder as recited in claim 2 wherein the lower portion of said peripheral cover wall is flared radially outward to provide an annular deck having at its outer edge a perch for birds wishing to alight on said feeder.

4. A humming bird feeder as recited in claim 3 wherein a rain shield, comprising an annular downwardly dished disc is provided which snugly fits said bottle; and means forming an annular shoulder on said bottle for supporting said rain shield at a proper level above said feeding bowl cover to shield feeding birds from rain.

References Cited by the Examiner
UNITED STATES PATENTS

| | | | |
|---|---|---|---|
| 783,706 | 2/1905 | Soleau | 119—77 |
| 1,567,760 | 12/1925 | Sittig | 119—77 |
| 2,267,883 | 12/1941 | Wood | 119—77 |

SAMUEL KOREN, *Primary Examiner.*

HUGH R. CHAMBLEE, *Examiner.*